(12) United States Patent
Abuomar (10) Patent No.: US 10,133,759 B1
(45) Date of Patent: Nov. 20, 2018

(54) SYSTEM FOR DETERMINING STORAGE OR OUTPUT OF DATA OBJECTS

(71) Applicant: AMAZON TECHNOLOGIES, INC., Seattle, WA (US)

(72) Inventor: Mohammad Haroon Mohammad Abuomar, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 500 days.

(21) Appl. No.: 14/855,257

(22) Filed: Sep. 15, 2015

(51) Int. Cl.
*G06F 17/30* (2006.01)

(52) U.S. Cl.
CPC .. *G06F 17/30312* (2013.01); *G06F 17/30598* (2013.01)

(58) Field of Classification Search
None
See application file for complete search history.

(56) References Cited

U.S. PATENT DOCUMENTS

| | | | | |
|---|---|---|---|---|
| 6,480,804 | B2 * | 11/2002 | Maeda | G01C 21/3484 345/418 |
| 8,380,942 | B1 * | 2/2013 | Corddry | G06F 12/0246 711/154 |
| 8,504,535 | B1 * | 8/2013 | He | G06F 17/30902 707/695 |
| 2007/0185925 | A1 * | 8/2007 | Prahlad | G06F 3/0605 |
| 2012/0317155 | A1 * | 12/2012 | Ogasawara | G06F 17/30997 707/812 |
| 2014/0025770 | A1 * | 1/2014 | Warfield | G06F 15/17331 709/213 |
| 2014/0136782 | A1 * | 5/2014 | Thomas | G06F 17/30115 711/117 |

* cited by examiner

*Primary Examiner* — Bai D Vu
(74) *Attorney, Agent, or Firm* — Lindauer Law, PLLC (57) ABSTRACT

Described are techniques for storing data objects heterogeneously, among multiple data stores, based on the values associated with one or more data object characteristics. A central device, entity, or network may receive data objects and determine a data store in which to store each data object. One or more rules that correspond to a received data object may be determined, a rule including expressions that associate characteristics of data objects to threshold values. The rules may specify particular data stores in which to store data objects based on the outcome of the expressions. The central device may generate a communication configured to access the determined data store(s) based on data store characteristics specific to the data store(s) and provide the data objects to the determined data stores. Data objects may be moved to other data stores responsive to a modification to a rule or to characteristics of a data object.

20 Claims, 7 Drawing Sheets

SYSTEM FOR DETERMINING STORAGE OR OUTPUT OF DATA OBJECTS

BACKGROUND

Data objects are typically stored in particular data stores based on the characteristics of the data objects and the capabilities of the data stores.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Owners of multiple data objects may store these data objects in certain data stores based on the characteristics of the data objects. For example, certain data stores may not be configured to store data objects greater than a particular size. As another example, a data owner may wish to store data objects that are frequently accessed by third parties in a data store capable of providing rapid access to the data objects. Conversely, data objects that are infrequently accessed may be stored in a data store providing less rapid access, but also a lower financial or computational cost.

In some cases, a data owner may store a large quantity of data objects in a single data store or group of data stores based on a particular business need. For example, a catalog of items associated with an online merchant may include a large quantity of data objects, each data object including a record associated with an item. A small portion of the records may be frequently accessed or updated during a particular month when a large volume of transactions is expected. Therefore, the online merchant may store the entire catalog of items in a data store that provides rapid access to the data records, potentially at a significant financial or computational cost. In other cases, a data owner may store data objects in particular data stores based on the capabilities of those data stores. For example, the majority of a group of data objects may be stored in a first data store. However, a portion of the group of data objects may have a size greater than that which may be accommodated by the first data store. This portion of the data objects may be stored in a different data store.

Described in this disclosure are techniques for storing data objects among multiple data stores, based on the characteristics of the data objects and data stores, using a centralized service or device. Characteristics of data objects may include physical characteristics, such as the size of a data object or the rate at which the data object is accessed (e.g., access frequency). Characteristics of data objects may also include logical characteristics specific to a particular data owner or type of data object. For example, a logical characteristic of an item in an online catalog may include a rank of the item relative to other items, a quantity of revenue associated with the item, a count of views of a webpage associated with the item, and so forth. Characteristics of data stores may include an access speed, a financial cost, a computational cost, a size constraint, a storage capacity, and so forth.

Data objects may be received from a data owner (e.g., a service or device), accompanied by an identifier associated with the data owner and an indication of a type or category associated with the data objects. Based on the identity of the data owner and the type or category of the data objects, one or more corresponding rules may be determined. In some implementations, the rules may be provided by the data owner concurrent with the data objects. In other implementations, preexisting rules associated with the data owner and the type or category of the data objects may be accessed. In still other implementations, if no existing rule associated with the data owner and the category of the data object(s) is determined, general rules associated with the system may be used. For example, general rules may be associated with the type or category of the data objects, and may be applied independent of the identity of the data owner. In some implementations, general rules may include rules that were previously generated by other entities. For example, a user associated with the system may determine one or more particular rules associated with entities for use as general rules applicable throughout the system. In some implementations, user input may be solicited from a data owner to confirm the use of general rules determined from other sources.

Each rule may include an expression associating a threshold value with a value of a characteristic of a data object. For example, a rule may be expressed using a logical language, specifying a characteristic of the data object (e.g., size, access frequency, sales rank), an operation (e.g., >, <, or =), and one or more outcomes based on the output of the expression. Continuing the example, a first data store may be configured to provide rapid access to data objects and store data objects having a size greater than 500 megabytes (MB). A second data store may provide slower access speed, but at a lower computational or financial cost. The second data store may not be configured to store data objects having a size greater than 500 MB. A rule for storing data objects using the first and a second datastore may read:

If (Size(DataObject)>500 MB OR SalesRank(DataObject)>50) {Store in DataStore1} else {Store in DataStore2}

Application of this rule to a group of data objects may result in all data objects having a size greater than 500 MB to be stored in the first data store, independent of the sales rank of the data object. All data objects having a sales rank greater than 50 may be stored in the first data store, independent of the size of the data object. And all data objects having both a size less than 500 MB and a sales rank less than 50 may be stored in the second data store.

The outcome associated with the rule may be determined for each data object. A rule outcome may include an indication of a data store or another type of output, such as streaming a data object to an output device, based on whether a particular expression is true or false. For example, for an expression from the rule described above, "If (Size(DataObject)>500 MB", a possible rule outcome is "{Store in DataStore1}" if the expression is true. Another possible rule outcome is "{Store in DataStore2}" if the expression if false. Based on the outcome of the rule, the corresponding data store may be determined. Storage data, indicative of the protocol, programming language, or other configurations used to access the data store may be accessed, and a communication may be generated using the determined protocol, programming language, or configuration(s). The communication may include at least a portion of the data object. The communication and data object may then be provided to the data store. In other implementations, data objects may be provided to devices for other types of output in lieu of or in addition to storage. For example, a data object may be streamed to a particular output device based on the outcome of a rule. In some implementations, a subsequent modification to a rule or to a characteristic of a data object (e.g., access frequency) may be determined. Responsive to this modification, a different outcome of a rule may be determined. Based on the different outcome, the data objects affected by the modification may be moved to different data stores or output in other manners.

In some implementations, a data owner may specify a particular characteristic of a data store, such as access speed or financial cost, and the outcome of the rule may be affected based on the characteristic. For example, a data owner may specify that a group of data objects should be stored in a manner that provides the lowest financial cost, independent of other considerations such as access speed or computational resources. Application of this criterion may result in the storage of each data object in the data store providing the lowest financial cost among data stores that are capable of storing the data object.

In some implementations, rules may be applied to portions of data objects separately. For example, a data object may pertain to a confidential item. A first portion of the data object may include information that identifies the item, such as an item name, material specifications, dimensions, and so forth. A second portion of the data object may include other information that does not identify the item, such as a price, a quantity of items in inventory, and so forth. The first portion of the data object may be stored in a data store providing enhanced security features and restricted access, while the second portion of the data object is stored in a data store providing a lower financial cost. Both portions of the data object may be provided with metadata indicating an association between the portions, such that if access to the data object is requested (e.g., by the data owner), both portions of the data object may be retrieved from separate data stores. The portions may be combined into a single data object and output to the requesting entity.

Implementations within the scope of the present disclosure may enable entities to provide data objects and rules to a single, centralized service or device, which may in turn provide the data objects to multiple data stores or other output devices using configurations (e.g., protocols, programming languages) suitable to the determined data stores or output devices. Data owners may thereby focus on business needs associated with particular data objects and maximize access or cost, as needed. Use of rules within a centralized service or device may enable rules associated with a first entity to be used with other entities that store similar types or categories of data objects. As rules or characteristics of the data objects are changed, the data objects may be moved to other data stores. Because every data object is handled by a centralized service or device, redundancy, duplicate data objects, and concurrent versions of data objects may be avoided. In some implementations, the centralized service or device my store a copy of data objects for archival purposes. For example, a copy of each data object may be stored in a data store providing low financial and computational costs. Periodically, a backfill process may be initiated to copy data objects from the archived data store to other data stores if absent, corrupt, or modified data objects are detected.

Figure 1:
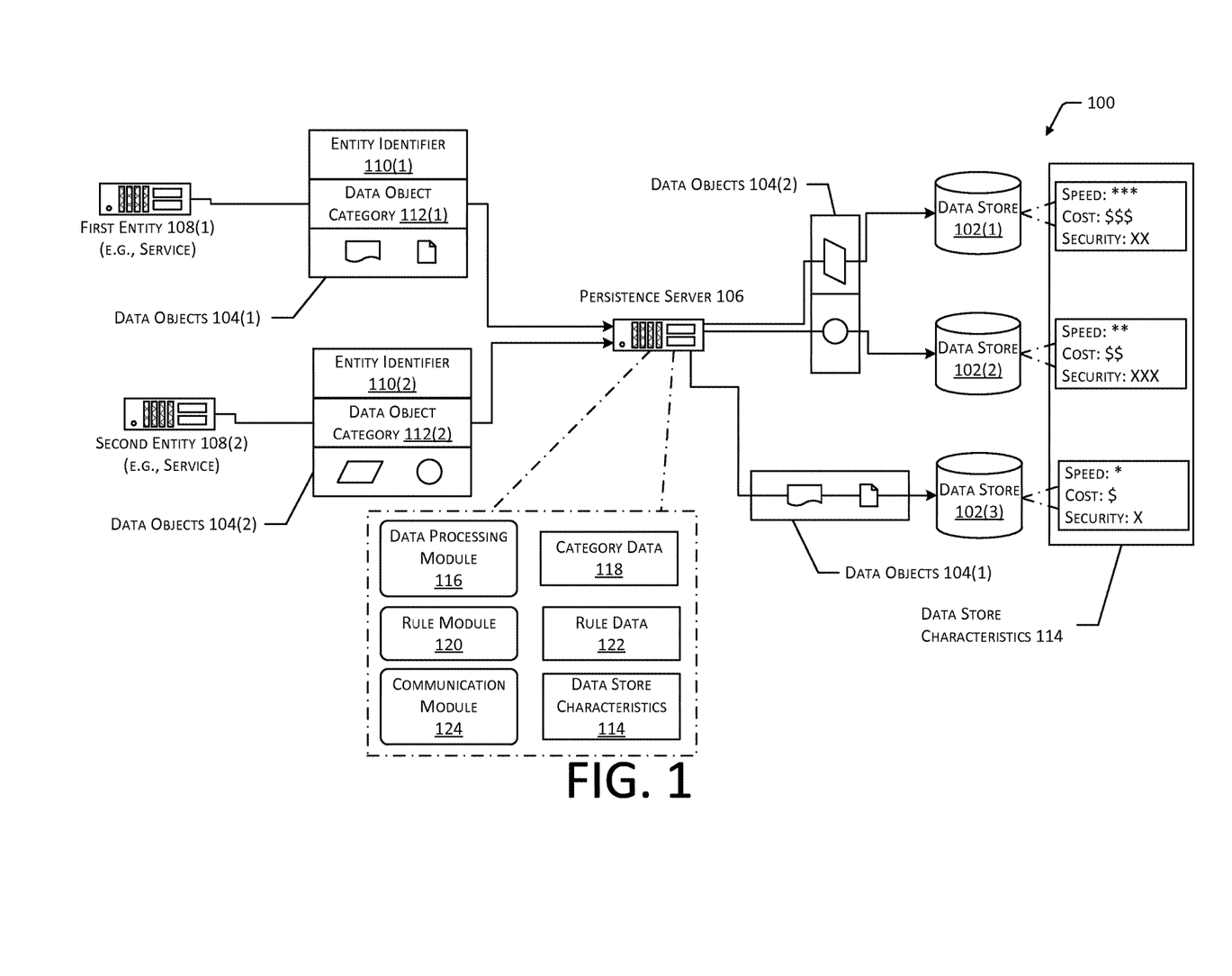
FIG. 1 depicts a system for determining data stores for storing received data objects based on one or more rules.

FIG. 1 depicts a system 100 for determining particular data stores 102 for storing received data objects 104 based on one or more rules. A persistence server 106 may act as a central device that receives data objects 104 from numerous entities 108, then, based on one or more rules associated with the entities 108, provides the data objects 104 to one or multiple data stores 102. While FIG. 1 depicts the persistence server 106 as a single server, the persistence server 106 may include any number and any type of computing devices, such as mobile devices, set-top boxes, tablet computers, personal computers, wearable computers, servers, and so forth.

The persistence server 106 may receive one or more data objects 104 from one or more entities 108. Entities 108 may include human users, services, or other types of processes. The entities 108 may be associated with computing devices including, but not limited to, those described with regard to the persistence server 106. The data objects 104 may include any manner of data, such as alphanumeric data, audio data, video data, image data, metadata, and so forth. For example, a data object 104 may include data relating to an item offered for sale, such as an image of the item, a price, a shipping cost, various characteristics of the item (dimensions, weight, materials, etc.), and so forth. Each data object 104 may have one or more characteristics unique to that data object. Characteristics may include physical characteristics, such as the size or access frequency of the data object. Characteristics may also include logical characteristics based on the type or category associated with the data object 104. Logical characteristics may include characteristics of a data object 104 that may not typically be determined by data stores 102. For example, a data object 104 associated with an item offered for sale may include characteristics such as a rank of the item relative to other items, a quantity of revenue associated with the item, a count of views of a webpage associated with the item, and so forth.

In addition to the data objects 104, themselves, an entity 108 may provide an entity identifier 110 indicative of the entity 108. The entity identifier 110 may include any manner of alphanumeric data, audio data, video data, image data, metadata, and so forth, that may be used to indicate the entity 108 that is providing the data objects 104. In some implementations, the entity identifier 110 may include a network address or one or more characteristics of the computing device associated with the entity 108. In some implementations, an entity 108 may also provide an indication of a data object category 112 corresponding to the data objects 104. For example, an entity 108 may indicate that a particular group of data objects 104 includes records of items offered for sale. As other examples, a data object category 112 may include information relating to user accounts, shipping information, financial transactions, and so forth.

FIG. 1 depicts a first entity 108(1), such as a service configured to maintain or modify data objects 104 relating to items for sale in an online catalog, providing a first set of data objects 104(1) to the persistence server 106. The first entity 108(1) may also provide a first entity identifier 110(1), indicative of the identity of the first entity 108(1), such as the name of a service, a user name, a name associated with a user account, an internet protocol (IP) address, and so forth. The first entity 108(1) may additionally provide an indication of the data object category 112(1) corresponding to the first data objects 104(1). For example, the indication of the data object category 112(1) may identify that the first data objects 104(1) include items for sale in an online catalog. A second entity 108(2) is shown providing a second set of data objects 104(2) to the persistence server 106. As an example, the second entity 108(2) may include a service configured to maintain or modify data associated with user accounts, such as user contact information, financial information, demographic information, and so forth. The second entity 108(2) may also provide a second identify identifier 110(2) and an indication of the data object category 112(2) corresponding to the second data objects 104(2).

Each data object 104 may be stored in a particular data store 102 based on the characteristics of the data object 104 and on the data store characteristics 114 associated with the data stores 102. Data store characteristics 114 may include configurations associated with an associated data store 102, such as the access speed associated with stored data objects 104, a financial cost associated with using or accessing the data store 102, a computational cost associated with use or access of the data store 102, security features associated with the data store 102, storage capacity of the data store 102, restrictions regarding sizes or types of data objects 104 that may be stored in the data store 102, and so forth. Data store characteristics 114 may also include one or more protocols, programming languages, or other configurations that may be used to access particular data stores 102. For example, a first data store 102(1) may include provide a high access speed and moderate security features, but at a high financial cost. A second data store 102(2) may provide high security features and moderate access speed at a moderate financial cost. A third data store 102(3) may provide low access speed and few security features, but at a low financial cost.

A data processing module 116 associated with the persistence server 106 may identify characteristics associated with the received data objects 104. For example, based on the data object category 112 associated with a received group of data objects 104, the data processing module 116 may determine particular logical characteristics associated with the data object category 112. Continuing the example, the data processing module 116 may determine that the first data objects 104(1) include items for sale in an online category. Based on this determination, the data processing module 116 may identify a sales rank, a quantity of revenue, a count of instances that a webpage associated with an item has been viewed, or other characteristics specific to the first data objects 104(1). As another example, the data processing module 116 may determine that the second data objects 104(1) include user account information. Based on this determination, the data processing module 116 may identify geographic locations associated with the second data objects 104(2). Category data 118 associated with the processing server 106 may associate particular data object categories 112 with characteristics of the data objects 104. The data processing module 116 may also determine characteristics of data objects 104, such as the size or access frequency associated with a data object 104. In some implementations, the data processing module 116 may also determine data store characteristics 114 corresponding to one or more data stores 102.

A rule module 120 associated with the processing server 106 may determine one or more rules associated with the received data objects 104. In some implementations, the rule module 120 may access rule data 122 that associates particular entity identifiers 110 and data object categories 112 with one or more rules. The rule module 120 may determine correspondence between the rule data 122 and the entity identifier 110 and data object category 112 associated with a set of data objects 104 to determine one or more rules that may be applied to the data objects 104.

For example, an entity 108 may provide one or more rules to the persistence server 106 concurrent with the data objects 104 or prior to providing the data objects. The rules may include an expression associating values of one or more characteristics of the data objects 104 with threshold values. In some implementations, the rules may be specific to a particular entity 108. For example, the first entity 108(1) may provide rules configured to cause storage of data objects 104 in different data stores 102 based on the total revenue generated through sales of the items represented by the data objects 104. Other entities 108 that provide data objects 104 associated with items for sale may choose to provide rules that analyze or prioritize different characteristics of the data objects 104. The second entity 108(2) may provide rules specific to characteristics of the second data objects 104(2). Rules may also be specific to particular data object categories 112(1). For example, rules specific to logical characteristics associated with items in an online catalog would not typically be applicable to data objects 104 lacking similar logical characteristics.

In some implementations, the rule data 122 may not include rules associated with a particular entity identifier 110. The rule module 120 may determine that other rules associated with the corresponding data object category 112(1) exist, such as rules generated by other entities 108. The other rules may output to the entity 108 to solicit user input confirming or rejecting the rules. In other implementations, the rules may automatically be applied to the received data objects 104.

The rule module 120 may also determine an outcome associated with one or more of the rules, for each received data object 104. For example, as described previously, a rule may include an expression that associates a characteristic of a data object 104 with a threshold value. Based on the values associated with the characteristics of the data objects 104, determined by the data processing module 116, and one or more threshold values, the rule module 120 may generate a particular outcome. For example, a rule associated with the first entity identifier 110(1) and the first data object category 112(1) may include the expression:

If (Revenue(DataObject)>$1000) {Store in DataStore1} else {Store in DataStore3}

The rule module 120 may determine that the total revenue associated with each of the first data objects 104(1) is less than the threshold value of $1000. Based on this determination, the rule module 120 may determine that the first data objects 104(1) are to be stored in the third data store 102(3).

A rule associated with the second entity identifier 110(2) and the second data object category 112(2) may include the expression:

If (UserInfo(DataObject)=CreditCard#) {Store in DataStore2} OR If (UserLocation(DataObject)=China) {Store in DataStore1} else {Store in DataStore3}

The rule module 120 may determine that a first portion of the second data objects 104(2) includes financial information, such as a user credit card number. Based on this determination, the first portion of the second data objects 104(2) may be stored in the second data store 102(2). The rule module 120 may determine that a second portion of the second data objects 104(2) includes user account information for users located in China. Based on this determination, the second portion of the second data objects 104(2) may be stored in the first data store 102(1).

A communication module 124 associated with the persistence server 106 may access the data store characteristics 114 to determine one or more of a protocol, a programming language, or other access features associated with the determined data stores 102. The communication module 124 may generate a communication using the determined protocol, language, and so forth. The communication may include the data object(s) 104 that are to be stored in the associated data store 102. The communication module 124 may then provide the communication and associated data object(s) 104 to the respective data stores 102 determined by the rule module 120. Use of a centralized persistence server 106 may enable any number of entities 108 to provide data objects 104 and rules to a single location, which may interface with any number of data stores 102.

Figure 2:
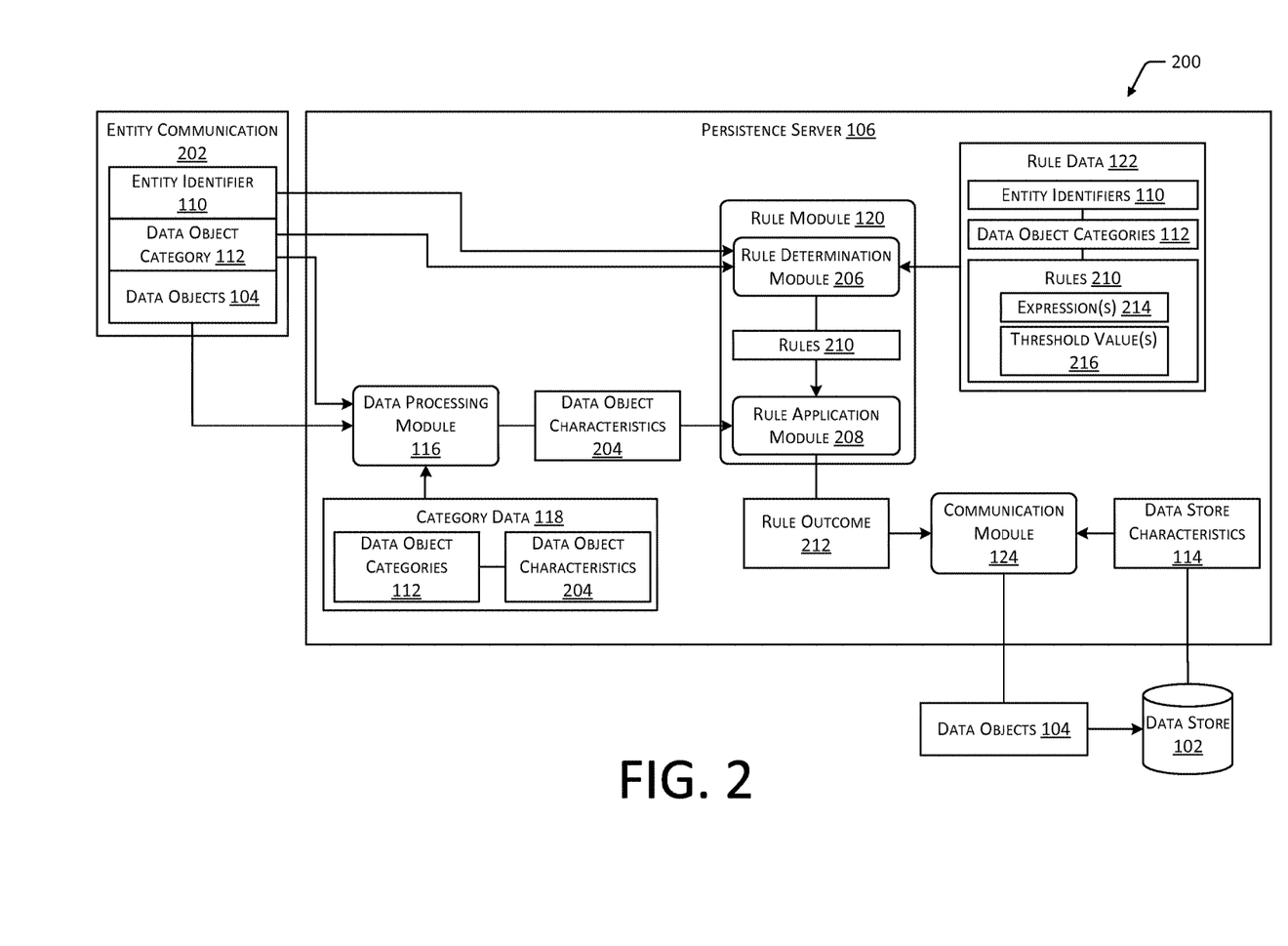
FIG. 2 is a block diagram illustrating the flow of information through a persistence server.

FIG. 2 is a block diagram 200 illustrating an example flow of information through a persistence server 106. As described previously with regard to FIG. 1, the persistence server 106 may act as a central device that receives data objects 104 from numerous entities 108, and then provides the data objects 104 to one or multiple data stores 102. An entity 108, such as a service, may provide an entity communication 202 to the persistence server 106. The entity communication 202 may include one or more data objects 104, an entity identifier 110 indicative of the entity 108, and an indication of the data object category 112.

The data processing module 116 associated with the persistence server 106 may determine data object characteristics 204 associated with the data object 104. Data object characteristics 204 may include physical characteristics, such as a size or access frequency of the data object 104. Data object characteristics 204 may also include logical characteristics, such as a sales rank, quantity of revenue, and so forth associated with the data object 104. In some implementations, the data processing module 116 may determine data object characteristics 204 from a data object 104, itself. For example, a size or access frequency of the data object 104 may be determined from data or metadata associated with the data object 104. In other implementations, the data processing module 116 may determine one or more data object characteristics 204 based on the data object category 112. For example, the data processing module 116 may access category data 118. The category data 118 may include one or more data object categories 112 that are associated with one or more data object characteristics 204. Continuing the example, the category data 118 may store a data object category 112 relating to items for sale through an online marketplace in association with data object characteristics 204 specific to items for sale, such as a sales rank or revenue associated with the item.

The rule module 120 associated with the processing server 106 may include a rule determination module 206 and a rule application module 208. The rule determination module 206 may determine one or more rules 210 that may be applied to particular data objects 104. The rule application module 208 may determine a rule outcome 212 based on the application of the rule(s) 210 to the data object characteristics 204. To determine the rule(s) 210, the rule determination module 206 may access rule data 122. The rule data 122 may include entity identifiers 110 and data object categories 112 that are associated with particular rules 210. The rule determination module 206 may determine the entity identifier 110 and the data object category 112 associated with the entity communication 202. The rule determination module 206 may then determine correspondence between the rule data 122 and the information determined from the entity communication 202. Based on this correspondence, the rule determination module 206 may determine one or more rules 210 that are associated with the entity identifier 110 and the data object category 112. For example, an entity 108 may have previously provided rules 210 and an indication of a data object category 112 to the persistence server 106. These rules 210 may be stored in association with the entity identifier 110 corresponding to the entity 108 and the data object category 112. In other implementations, the rule module 120 may receive rules 210 as part of the entity communication 202. In still other implementations, the rule module 120 may determine correspondence between the data object category 112 and one or more rules 210. However, the rules 210 may be associated with an entity 108 other than the entity 108 indicated by the entity identifier 110. For example, two different entities 108 may store data objects 104 having the same data object category 112. In some cases, no existing rules 210 may be associated with the entity identifier 110(1) corresponding to the first entity 108(1). However, rules associated with a second entity identifier 110(2) and the same data object category 112 may be applicable to the data objects 104 provided by the first entity 108(1).

The rule application module 208 may apply the determined rule(s) 210 to the data object characteristics 204 of the data objects 104 to determine a rule outcome 212. For example, a rule 210 may include one or more expressions 214, which may associate values of data object characteristics 204 with one or more threshold values 216. The expressions 214 may include one or more constructs, such as conditional language (e.g., If, Then, Else), and grouping symbols (e.g., parenthesis, brackets, braces). The expressions 214 may also include operators, such as identifiers of data object characteristics 204 and indications of relationships (e.g., >, <, or =). The expressions 214 may also include identifications of data objects 104 and data stores 102. For example, a rule 210 may be structured as: "If [characteristic] >Threshold, store in DataStore1. Else, store in DataStore2." Any number of rules 210 or expressions 214 may be applied to a data object 104. For example, a rule 210 may include multiple nested expressions 214. If a first expression 214 is false, a second expression 214 may be applied. The order or arrangement of expressions 214 within a rule 210 may affect the manner in which the expressions 214 are prioritized and the rule outcome 212.

The communication module 124 of the persistence server 106 may determine data store characteristics 114 associated with the data store 102 indicated by the rule outcome 212. The data store characteristics 114 may include a configuration for accessing the data store 102, such as a protocol, a programming language, and so forth. Based on the data store characteristics 114, the communication module 124 may generate a communication transmitting the data objects 104 to the data store 102 determined in the rule outcome 212.

Figure 3:
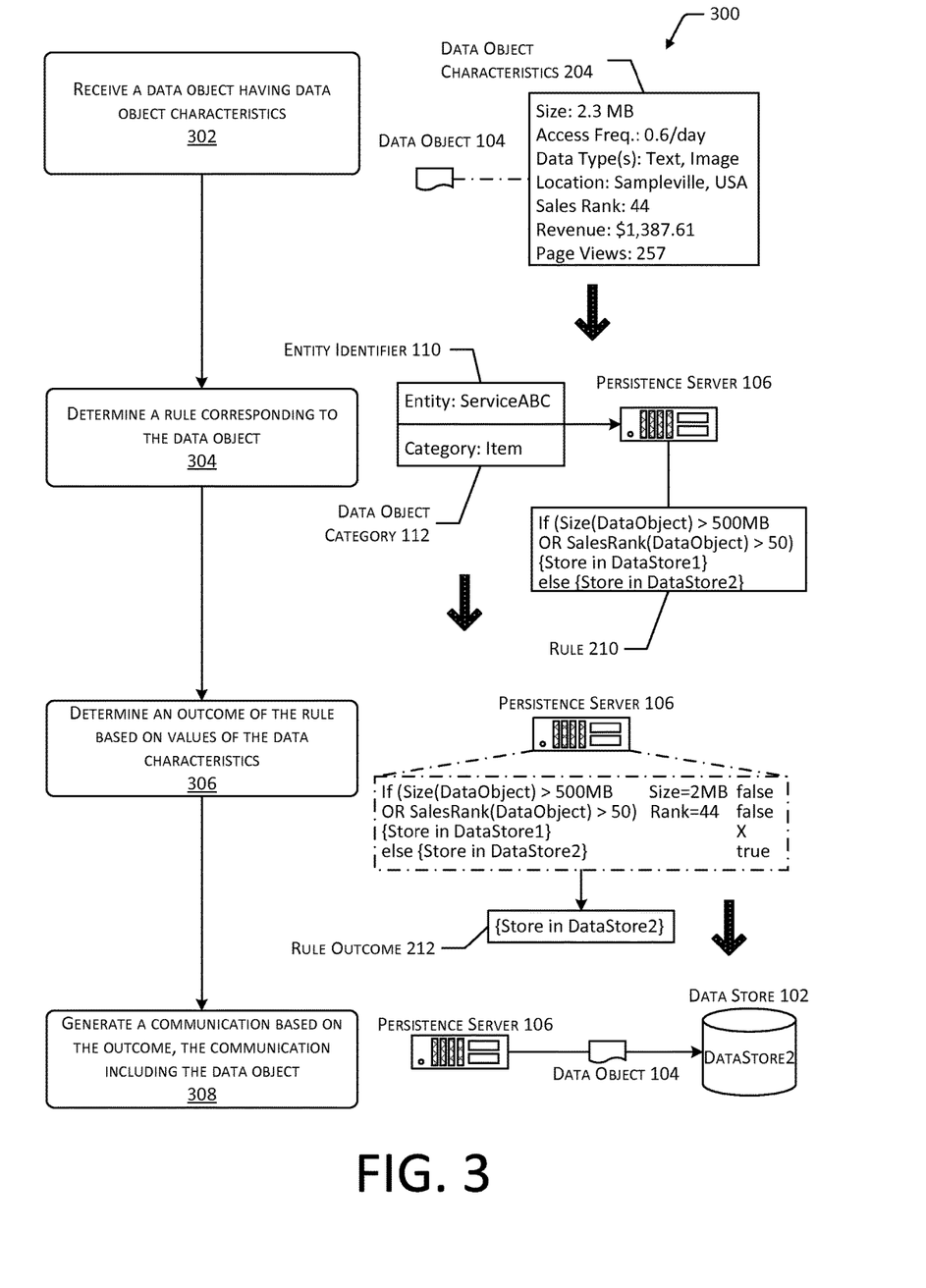
FIG. 3 depicts a scenario illustrating a method for determining one or more rules associated with a data object and providing the data object to a data store indicated by the rule(s).

FIG. 3 depicts a scenario 300 illustrating a method for determining one or more rules 210 associated with a data object 104 and providing the data object 104 to a data store 102 indicated by the outcome of the rule(s) 210. At 302, a data object 104 may be received by a persistence server 106. In some implementations, the data object 104 may be provided by an entity 108, such as a service, a user, or another type of process or device. In other implementations, the data object 104 may be accessed by the persistence server 106. For example, the data object 104 may be stored in association with the persistence server 106 or in association with a data store 102 or computing device in communication with the persistence server 106. The data object 104 may include data object characteristics 204. For example, the data object characteristics 204 may include physical characteristics of the data object 104, such as a size of the data object (e.g., 2.3 MB), an access frequency of the data object (e.g., 0.6/day), a type of data associated with the data object (e.g., Text, Image), or a location associated with an entity 108 providing the data object 104 (e.g., Sampleville, USA). The data object characteristics 204 may include logical characteristics associated with the data object due to the category or nature of the data object 204. For example, if the data object 104 relates to an item for sale by an online merchant, logical characteristics may include a sales rank (e.g., 44), a quantity of revenue (e.g., $1,387.61), or a count of page views of a webpage associated with the item (e.g., 257). As described previously with regard to FIG. 2, a data processing module 116 of the persistence server 106 may determine the data object characteristics 204 of the data object 104.

At 304, a rule 210 corresponding to the data object 104 may be determined. For example, the persistence server 106 may determine an entity identifier 110 associated with the entity 108 that provided the data object 104. The persistence server 106 may also determine a data object category 112 associated with the data object 104. In some implementations, an indication of the data object category 112 may be provided to the persistence server 106 by the entity 108. In other implementations, the persistence server 106 may determine the data object category 112 based on data or metadata associated with the data object 104. Based at least in part on the entity identifier 110 and the data object category 112, the persistence server 106 may determine one or more rules 210 that may be applied to the data object 104. As described previously with regard to FIG. 2, a rule determination module 206 associated with the persistence server 106 may determine correspondence between rule data 122 and the determined entity identifier 110 and data object category 112. The rule data 122 may associate one or more rules 210 with various entity identifiers 110 and data object categories 112. For example, the rule determination module 206 may determine an existing rule 210 that was previously provided by the entity 108 and used in conjunction with data objects 104 having the same data object category 112. In other implementations, a rule 210 may be received by the persistence server 106 concurrent with the data object 104. In still other implementations, the persistence server 106 may determine one or more rules 210 associated with the same data object category 112 of the data object 104, but different entity identifiers 110.

FIG. 3 depicts an example rule 210 that reads: "If (Size (DataObject)>500 MB OR SalesRank(DataObject)>50) {Store in DataStore1} else {Store in DataStore2}". The example rule 210 includes three expressions 214 and two threshold values 216. The first expression 214 describes a relationship between a data object characteristic 204 (the size of the data object 204) and a threshold value 216 (500 MB). If the first expression 214 is true, a first rule outcome 212 is described: storage of the data object 104 in a first data store 102(1). The second expression 214 also describes a relationship between a data object characteristic 204, a sales rank of the data object 104, and a threshold value 216, 50. If the second expression 214 is true, the first rule outcome 212 may be provided. The third expression 214 describes a second rule outcome 212 that may occur if both the first expression 214 and the second expression 214 are false: storage of the data object 104 in a second data store 102(2).

At 306, the outcome of the rule 210 is determined based on values of the data characteristics 204. As described previously with regard to FIG. 2, a rule application module 208 may determine a rule outcome 212 based on the data object characteristics 204 and the rules 210. For example, the data characteristics 204 may indicate a size of the data object 104 to be 2.3 MB. A corresponding rule 210 may indicate that files having a size of greater than 500 MB are to be stored in a first data store 102(1). The rule application module 208 may determine that the size of the data object 104 is less than the threshold value 216 of the rule, and therefore that the corresponding expression 214 is false. Continuing the example, the data characteristics 204 may indicate that a sales rank of the data object is 104. The rule application module 208 may determine that the sales rank of the data object 104 is less than the corresponding threshold value 216, and therefore that the corresponding expression 214 is false. Because the first and second expressions 214 may be determined to be false, the third expression 214 may be determinative of the rule outcome 212. Specifically, because the example data object 104 has a size less than 500 MB and a sales rank less than 50, the rule outcome 212 may indicate that the data object 104 is to be stored in a particular data store 102 (e.g., "DataStore2").

At 308, the persistence server 106 may generate a communication based on the outcome, the communication including the data object 104. As described previously with regard to FIG. 2, the communication module 124 associated with the persistence server 106 may determine the data store 102 to which the data objects 104 are to be stored from the rule outcome 112. The communication module 124 may determine data store characteristics 114 associated with the data store 102, such as a protocol or programming language used by the data store 102. The communication module 124 may generate a communication that includes the data object 104 and provide the data object 104 to the data store 102.

Figure 4:
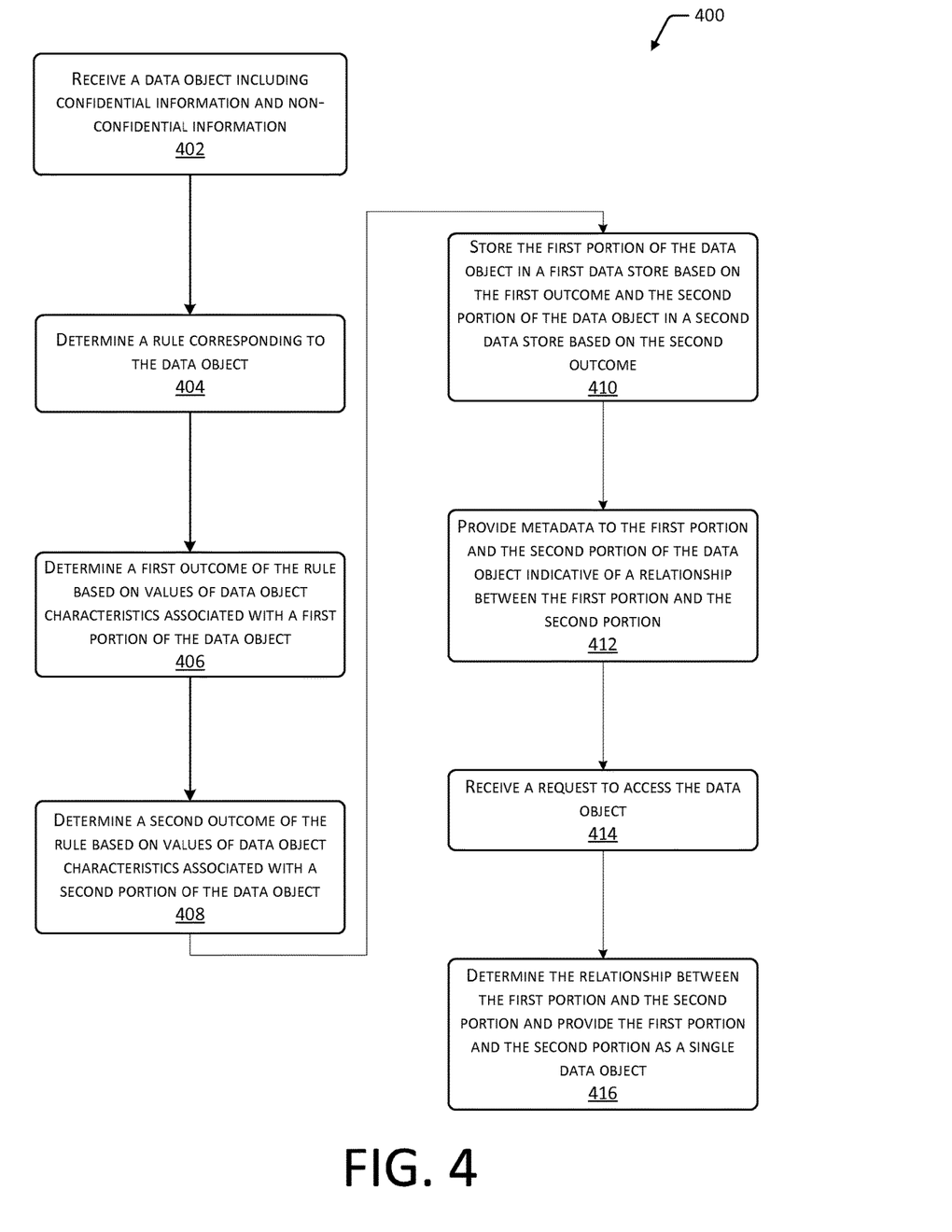
FIG. 4 is a flow diagram illustrating a method for determining different rule outcomes with regard to different portions of a data object, storing the portions in different data stores, and accessing both portions responsive to a request to access the data object.

FIG. 4 is a flow diagram 400 illustrating a method for determining different rule outcomes 212 with regard to different portions of a data object 104, storing the portions in different data stores 102, and accessing both portions responsive to a request to access the data object 104. Block 402 receives a data object 104 that includes confidential information and non-confidential information. For example, a data owner may desire to retain certain types of information in a secure manner, e.g., due to a legal requirement, a business policy, or for logistical reasons, while storing other types of information within the same data object 104 in a manner that reduces financial cost. Continuing the example, a data object 104 may include information relating to an upcoming product that has not yet been released. Confidential portions of the data object 104 may include information relating to the product's identity, capabilities, parts, material specifications, images of the product, and so forth. Non-confidential portions of the data object 104 may include information relating to the product's price, quantity in stock, category, and so forth. In some implementations, an entity 108 or data owner may specify particular portions of a data object 104 that are subject to certain storage requirements or preferences. In other implementations, a preexisting policy or rule 210 may determine that certain portions of a received data object 104 are to be stored in a certain manner, while other portions of the data object 104 may be stored in a different manner.

Block 404 determines a rule 210 corresponding to the data object 104. For example, a rule determination module 208 associated with the persistence server 106 may determine one or more of an entity identifier 110, data object category 112, or data object characteristics 204 associated with the data object 104. Based on this determination, the rule determination module 208 may access rule data 122 to determine a rule 210 that corresponds to the data object 104.

Block 406 determines a first outcome of the rule 210 based on values of the data object characteristics 204 associated with a first portion of the data object 104. As described previously with regard to FIGS. 2 and 3, a rule may include one or more expressions 214 and threshold values 216. The expressions 214 may indicate a particular rule outcome 212 based on correspondence between the value of a data object characteristic 204 and a threshold value 216. For example, an expression 214 may indicate that if a portion of a data object 104 includes a product name corresponding to an upcoming product, one or more keywords or alphanumeric strings corresponding to capabilities of the upcoming product, and so forth, then that portion of the data object 104 may be stored in a data store 102 having enhanced security features.

Block 408 determines a second outcome of the rule 210 based on values of data object characteristics 204. For example, the rule 210 may include one or more additional expressions 214 that indicate that if a portion of the data object 104 includes non-confidential information, or does not include any items identified as confidential information (e.g., using one or more threshold values 216), that portion of the data object 104 may be stored in a data store 102 having a low financial cost. Continuing the example, a second expression 214 may be contingent on the outcome of the first expression 214. While the first expression 214 may indicate that portions of data objects 104 including certain data object characteristics 204 are to be stored in a first data store 102(1), the second expression 214 may indicate "Else {Store in DataStore2}", such that any portions of the data object 104 for which the first expression 214 is false may be stored in a second data store 102(2).

Block 410 stores the first portion of the data object 104 in a first data store 102(1) based on the first outcome, and stores the second portion of the data object 104 in a second data store 102(2) based on the second outcome. As described previously with regard to FIGS. 1-3, a communication module 124 may determine data store characteristics 114 associated with the first data store 102(1) and the second data store 102(2). The data store characteristics 114 may include a protocol, a programming language, or other configuration information that may be used to access the data stores 102. Based on the data store characteristics 114, the communication module 124 may generate a first communication that includes the first portion of the data object 104 for transmission to the first data store 102(1). The communication module 124 may also generate a second communication that includes the second portion of the data object 104 for transmission to the second data store 102(2).

Block 412 provides metadata to the first portion and the second portion of the data object 104 indicative of a relationship between the first portion and the second portion. For example, prior to the release of an upcoming product, the data owner or another entity 108 may attempt to access the data object 104. As another example, after the release of the product, it may no longer be necessary to maintain a portion of the data object 104 in a confidential manner. Because portions of the data object 104 are stored in separate data stores 102, both portions of the data object 104 may be retrieved responsive to a request from the data owner or other entity 108. Metadata associated with one or both portions of the data object 104 may indicate the relationship between the portions, such that when one portion of the data object 104 is accessed, the other portion may be located an accessed. In other implementations, data or metadata indicating the relationship between the portions of the data object 104 may instead be stored in association with the persistence server 106. For example, the persistence server 106 may maintain a log or other type of record indicating the location where data objects 104 or portions of data objects 104 are stored, relationships between data objects 104 or portions of data objects 104, and so forth. Based on the record maintained by the persistence server 106, an entity 108 may provide a single request to access a data object 104 to the persistence server 106. The persistence server 106 may then provide multiple requests to multiple data stores 102 to retrieve each portion of the requested data object 104.

For example, block 414 receives a request to access the data object 104. Based on the request, block 416 may determine the relationship between the first portion and the second portion, such as by accessing the metadata associated with the portion(s) of the data object 104 or the persistence server 106. Based on the determined relationship, the persistence server 106 may provide both the first portion and the second portion of the data object 104 to the requesting entity 108 as a single data object 104.

Figure 5:
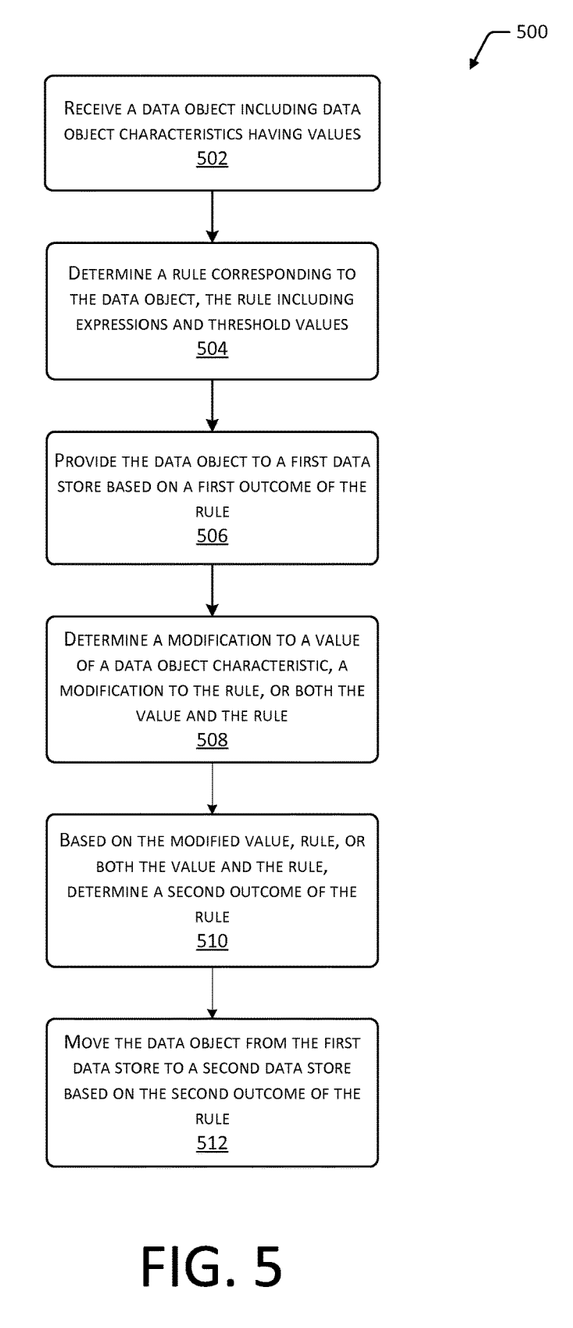
FIG. 5 is a flow diagram illustrating a method for determining a modification to a rule or a data object and moving the data object to a different data store based on a different rule outcome.

FIG. 5 is a flow diagram 500 illustrating a method for determining a modification to a rule 210 or a data object 104 and moving the data object 104 to a different data store 120 based on a different rule outcome 212. Block 502 receives a data object 104 including data object characteristics 204 having values. Data objects 104 may be received from an entity 108 (e.g., a service) or accessed from a data store 102 or other computing device associated with the persistence server 106. The data object 104 may include one or more data object characteristics 204 that may be determined from the data object 104, itself, such as a size or access frequency of the data object 104. Other data object characteristics 204 may be determined based on a data object category 112 associated with the data object 104.

Block 504 determines a rule 210 corresponding to the data object 104, the rule including expressions 214 and threshold values 216. For example, an expression 214 of the rule 210 may indicate a particular rule outcome 212 if a value of a particular data object characteristic 204 is greater than, less than, or equal to a threshold value 216. Continuing the example, the rule 210 may indicate that if the access frequency of the data object 104 exceeds ten accesses per day, the data object 104 is to be stored in a data store 102 configured for rapid access to stored data objects 104.

Block 506 provides the data object 104 to a first data store 102(1) based on a first outcome of the rule 210. Continuing the example, the access frequency of a data object 104 may be determined to exceed ten accesses per day. Responsive to this determination, the rule outcome 212 may indicate that the data object 104 is to be stored in a first data store configured for rapid access to stored data objects 104.

Block 508 determines a modification to a value of a data object characteristic 204, a modification to the rule 210, or both the value and the rule 210. For example, at a later time, the access frequency of the data object 104 may decrease to a value less than ten accesses per day. As another example, the entity 108 may modify the rule 210 such that the expression 214 indicates that data objects 104 having an access frequency greater than fifty accesses per day are to be stored in the first data store 102(1).

Based on the modified value, rule 210, or both the value and the rule 210, block 510 determines a second outcome of the rule 210. Continuing the example, if the decreased access frequency of the data object 104 is a value less than the threshold value 216 of ten accesses per day, the rule outcome 212 may indicate that the data object 104 is to be stored in a second data store 102(2) having a lower financial cost. As another example, if the rule 210 is modified to change the threshold value 216 to fifty accesses per day, and the modified threshold value 216 exceeds the value of the access frequency associated with the data object 104, the rule outcome 212 may indicate that the data object 104 is to be stored in the second data store 102(2). Based on the second outcome of the rule 210, block 512 moves at least a portion of the data object 104 from the first data store 102(2) to a second data store 102(2). In some implementations, an entire data object 104 may be moved to the second data store 102(2) due to a modification to the rule 210 or to the data object 104. In other implementations, a portion of the data object 104 may be moved to a second data store 102(2) while other portions are retained in the first data store 102(1), or moved to other data stores 102. For example, an owner of a data object 104 may modify the data object to include confidential information, such as information regarding the technical specifications of a product that has not yet been released for sale. Application of the rule 210 to the modified data object 104 may determine one or more portions of the data object 104 to be stored in an alternate data store 102, while retaining other portions of the data object 104 in the original data store 102.

Figure 6:
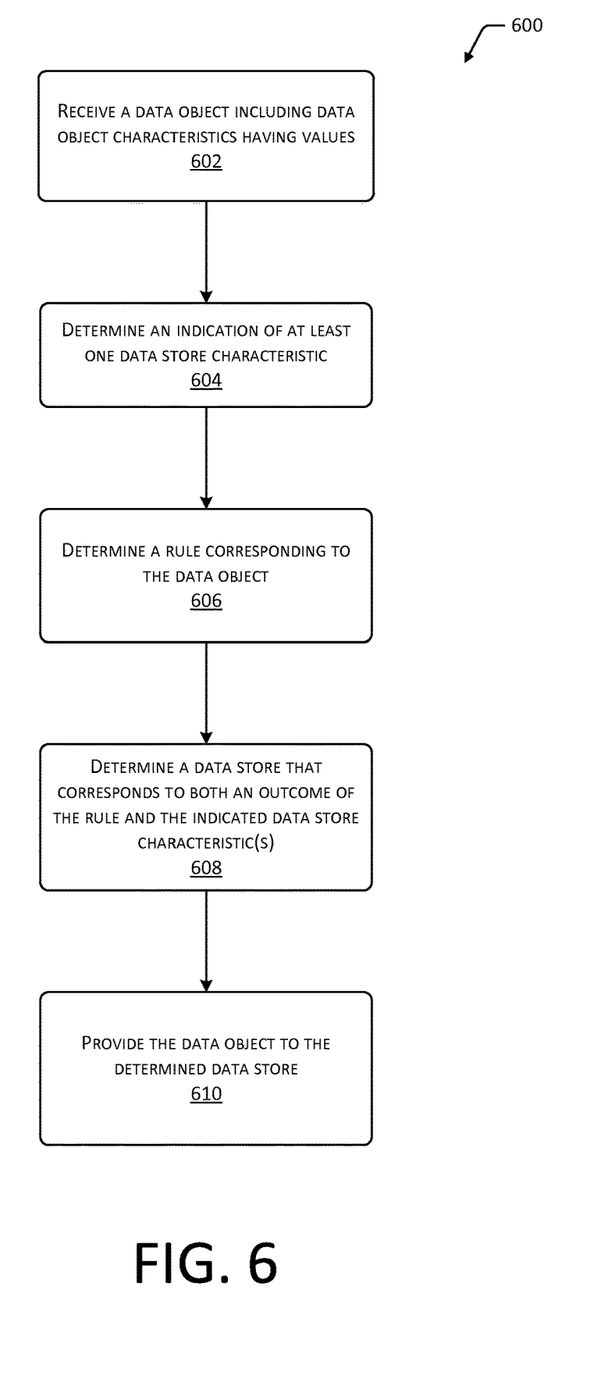
FIG. 6 is a flow diagram illustrating a method for determining a data store in which to store a data object based on an indication of a data store characteristic provided by an entity.

FIG. 6 is a flow diagram 600 illustrating a method for determining a data store 102 in which to store a data object 104 based on an indication of a data store characteristic 114 provided by an entity 108. Block 602 receives a data object 104 including data object characteristics 204 having values. As described previously with regard to FIG. 5, data objects 104 may be received from an entity 108 or accessed by the persistence server 106. The data object characteristics 204 may be determined from the data object 104, itself, or based on a data object category 112 associated with the data object 104.

Block 604 determines an indication of at least one data store characteristic 114. For example, an entity 108 may provide an indication that data objects 104 are to be stored in a manner that minimizes financial cost associated with storage of the data objects 104. As another example, an entity 108 may provide an indication that data objects 104 are to be stored in a manner that maximizes the access speed associated with access of the data objects 104. In some implementations, the indication of the data store characteristic(s) 114 may be included as part of a rule 210. In other implementations, the indication may be used to modify an existing rule 210.

Block 606 determines a rule 210 corresponding to the data object 104. For example, a rule determination module 208 may determine correspondence between rule data 122 and an entity identifier 110 or data object category 112 of the data object 104. As another example, the rule determination module 208 may determine correspondence between the rule data 122 and one or more portions of the data object 104, itself. The rule 210 may associate rule outcomes 212 with particular expressions 214. For example, the rule 210 may specific particular data stores 102 in which to store data objects 104 based on the relationship between certain data object characteristics 204 and one or more threshold values 216. In some implementations, the rule outcome 212 may indicate other types of output in addition to or in lieu of storage of a data object 104. For example, based on the value of certain data object characteristics 204, the data object 104 may be streamed to a particular device.

Block 608 determines a data store 102 that corresponds to both an outcome of the rule 210 and the indicated data store characteristic(s) 114. Block 610 provides the data object 104 to the determined data store 102. For example, a rule 210 may include rule outcomes 212 that indicate possible storage of data objects 104 in multiple data stores. As another example, a rule 210 may include a particular rule outcome 212 for storing data objects 104 for which an expression 214 is true, but may not specify a rule outcome 212 for other data objects 104. An indicated data store characteristic 114 may be used to determine particular data stores 102 in which to store data objects 104 if a rule 210 indicates multiple possible data stores 102 or does not indicate a data store 102 for a particular data object 104. In other implementations, a data store characteristic 114 indicated by an entity may be included within a rule 210. For example, multiple expressions 214 of a rule 210 may be arranged in a nested or hierarchal manner, such that a first rule outcome 212 is followed if a first expression 214 is true, and an outcome of a second expression 214 is only determined if the first expression 214 is false.

Figure 7:
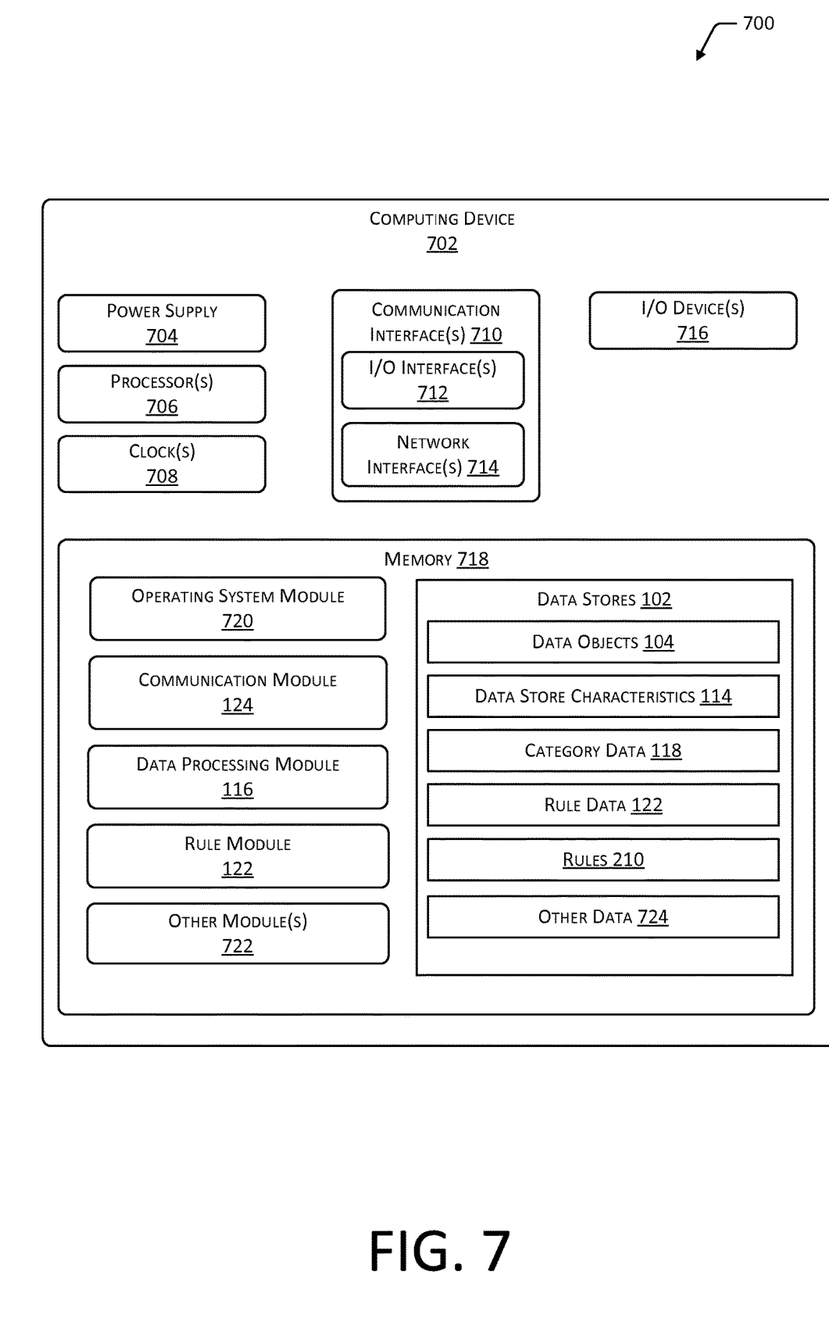
FIG. 7 is a block diagram illustrating a computing device within the scope of the present disclosure.

FIG. 7 is a block diagram 700 illustrating a computing device 702 within the scope of the present disclosure. The computing device 702 may include the persistence server 106 or one or more other computing devices 702 or data stores 102 in communication with the persistence server 106. Any type of computing device 702 and any number of networked computing devices 702 may perform the implementations described herein.

One or more power supplies 704 may be configured to provide electrical power suitable for operating the components of the computing device 702. In some implementations, the power supply 704 may include a rechargeable battery, fuel cell, photovoltaic cell, power conditioning circuitry, and so forth.

The computing device 702 may include one or more hardware processor(s) 706 (processors) configured to execute one or more stored instructions. The processor(s) 706 may include one or more cores. One or more clocks 708 may provide information indicative of date, time, ticks, and so forth. For example, the processor(s) 706 may use data from the clock 708 to generate a timestamp, trigger a preprogrammed action, and so forth.

The computing device 702 may include one or more communication interfaces 710, such as input/output (I/O) interfaces 712, network interfaces 714, and so forth. The communication interfaces 710 may enable the computing device 702, or components of the computing device 702, to communicate with other computing devices 702 or components of the other computing devices 702. The I/O interfaces 712 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 712 may couple to one or more I/O devices 716. The I/O devices 716 may include any manner of input device or output device associated with the computing device 702. For example, I/O devices 716 may include touch sensors, keyboards, mouse devices, microphones, image sensors (e.g., cameras), scanners, displays, speakers, haptic devices, printers, and so forth. In some implementations, the I/O devices 716 may be physically incorporated with the computing device 702 or may be externally placed.

The network interfaces 714 may be configured to provide communications between the computing device 702 and other devices, such as the I/O devices 716, routers, access points, and so forth. The network interfaces 714 may include devices configured to couple to one or more networks including local area networks (LANs), wireless LANs (WLANs), wide area networks (WANs), wireless WANs, and so forth. For example, the network interfaces 714 may include devices compatible with Ethernet, Wi-Fi®, Bluetooth®, ZigBee®, Z-Wave®, 3G, 4G, LTE®, and so forth.

The computing device 702 may include one or more busses or other internal communications hardware or software that allows for the transfer of data between the various modules and components of the computing device 702.

As shown in FIG. 8, the computing device 702 may include one or more memories 718. The memory 718 may include one or more computer-readable storage media (CRSM). The CRSM may be any one or more of an electronic storage medium, a magnetic storage medium, an optical storage medium, a quantum storage medium, a mechanical computer storage medium, and so forth. The memory 718 may provide storage of computer-readable instructions, data structures, program modules, and other data for the operation of the computing device 702. A few example modules are shown stored in the memory 718, although the same functionality may alternatively be implemented in hardware, firmware, or as a system on a chip (SoC).

The memory 718 may include one or more operating system (OS) modules 720. The OS module 720 may be configured to manage hardware resource devices such as the I/O interfaces 712, the network interfaces 714, the I/O devices 716, and to provide various services to applications or modules executing on the processors 706. The OS module 720 may implement a variant of the FreeBSD™ operating system as promulgated by the FreeBSD Project; UNIX™ or a UNIX-like operating system; a variation of the Linux™ operating system as promulgated by Linus Torvalds; the Windows® operating system from Microsoft Corporation of Redmond, Wash., USA; or other operating systems.

One or more data stores 102 and one or more of the following modules may also be associated with the memory 718. The data store(s) 102 may include data stores 102 available for storage of data objects 104, or the computing device 702 may include separate data stores 102 for storage of modules and data for use by the computing device 702.

The modules may be executed as foreground applications, background tasks, daemons, and so forth. The data store(s) 102 may use a flat file, database, linked list, tree, executable code, script, or other data structure to store information. In some implementations, the data store(s) 102 or a portion of the data store(s) 102 may be distributed across one or more other devices including other computing devices 702, network attached storage devices, and so forth.

The communication module 124 may be configured to establish communications with one or more other computing devices 702, such as computing devices 702 associated with entities 108, computing devices 702 associated with data stores 102, persistence server(s) 106, computing devices 702 associated with a persistence server 106, and so forth. Communications may be authenticated, encrypted, and so forth.

The memory 718 may store the data processing module 116. The data processing module 116 may determine data object characteristics 204 from received data objects 104. In some implementations, data object characteristics 204 may be determined from data objects 104, themselves. In other implementations, the data processing module 116 may determine correspondence between category data 118 and the data object category 112 associated with the data object 104. The category data 118 may include data object categories 112 associated with one or more data object characteristics 204. Based on the correspondence between the data object category 112 of the data object 104 and a particular data object category 112 of the category data 118, the data processing module 116 may determine the data object characteristics 204 associated with the particular data object category 112. In some implementations, the data processing module 116 may also determine data store characteristics 114 corresponding to one or more data stores 102.

The memory 718 may also store the rule module 120. The rule module 120 may include a rule determination module 208 for determining one or more rules 210 associated with received data objects 104. In some implementations, the rule module 120 may access rule data 122 that associates particular entity identifiers 110 and data object categories 112 with one or more rules 210. The rule module 120 may determine correspondence between a particular entity identifier 110 or data object category 112 of the rule data 122 and the entity identifier 110 or data object category 112 of a data object. Based on this correspondence, the rule module 120 may determine the rules 210 associated with the particular entity identifier 110 or data object category 112 of the rule data 122. In other implementations, the rule module 120 may determine correspondence between portions of the data object 104 or particular data object characteristics 204 and the rule data 122. The rule module 120 may also include a rule application module 208 that determines rule outcomes 212 associated with one or more rules 210 for a received data object 104. For example, the rule module 120 may access one or more expressions 214 associated with a rule 210 and determine, based on the value of a data object characteristic 204, whether an expression 214 is true or false.

Other modules 722 may also be present in the memory 718. For example, encryption modules may be used to encrypt and decrypt communications between computing devices 702. Authentication modules may be used to authenticate communications sent or received by computing devices 702. Other modules 722 may further include a user interface module, which may receive and process user interactions associated with generation or modification of rules 210.

Other data 724 within the data store(s) 102 may include user input data, such as configurations and settings associated with computing devices 702 or data stores 102. Other data 724 may include security data, such as encryption keys and schema, access credentials, and so forth.

In different implementations, different computing devices 702 may have different capabilities or capacities. For example, persistence servers 106 compared to computing devices 702 associated with data stores 102 or entities 108.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet. Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more memories storing computer-executable instructions; and
one or more hardware processors configured to execute the computer-executable instructions to:
receive, from a device associated with a first service:
an identifier indicative of the first service;
a data object having characteristics including one or more of size, access frequency, rank relative to other data objects, revenue associated with the data object, or a count of views of a webpage associated with the data object; and
an indication of a category of the data object, the category associated with a characteristic of the data object;
determine one or more rules corresponding to the identifier and the category, the one or more rules associating the characteristic with one or more data stores, wherein the one or more rules include:
an expression associating a threshold value with the characteristic;
an indication of a first data store associated with a first outcome of the expression; and
an indication of a second data store associated with a second outcome of the expression;
determine a first storage outcome associated with the expression based at least in part on a value of the characteristic and the threshold value, the first storage outcome including the first outcome of the expression;
determine storage data associated with the first data store, the storage data indicating one or more of a protocol or a programming language associated with the first data store;
based on the storage data generate a communication using the one or more of the protocol or the programming language, the communication including the data object;
provide the communication and the data object to the first data store;
determine a modification to one or more of the characteristic or the expression;
in response to the modification, determine a second storage outcome based on the characteristic and the expression, the second storage outcome including the second outcome of the expression; and
provide the data object to the second data store.

2. The system of claim 1, further comprising computer-executable instructions to:
receive, from the device associated with the first service, an indication of at least one data store characteristic, the at least one data store characteristic including one or more of: an access speed of the data store, a financial cost of the data store, or a computational cost of the data store;
wherein the first outcome is further based on the at least one data store characteristic.

3. The system of claim 1, wherein the comprising computer-executable instructions to determine the one or more rules corresponding to the identifier and the category include computer-executable instructions to:

determine an absence of a rule corresponding to the identifier and to the category that was received from the device associated with the first service; and determine a general rule that was received from a device associated with a second service, wherein the general rule is associated with on one or more of the category or the characteristic of the data object, the general rule associating the characteristic with the one or more data stores.

4. The system of claim 1, further comprising computer-executable instructions to:

determine that the data object includes a first portion associated with confidential information and a second portion associated with non-confidential information, wherein the characteristic includes a presence of the confidential information and the first storage outcome is determined for the first portion of the data object;

determine a third storage outcome based on the second portion; and based on the third storage outcome, provide the second portion in the second data store.

5. A method comprising:

receiving a data object that includes a first portion having a first characteristic and a second portion having a second characteristic;

determining at least one rule associating characteristics of data objects with a plurality of data stores, the at least one rule including one or more expressions associating a first value of the first characteristic with a threshold value and a second value of the second characteristic with the threshold value, wherein one or more outcomes of the one or more expressions may be determined based on the first value and the second value;

determining a first outcome of the one or more expressions based on the first value of the first characteristic;

determining a first data store corresponding to the first outcome, wherein the first data store includes at least one first data store characteristic associated with the first characteristic of the first portion of the data object;

determining one or more of a first protocol or a first programming language associated with the first data store;

generating a first communication using the one or more of the first protocol or the first programming language, the first communication including the first portion of the data object; and providing the first communication and the first portion of the data object to the first data store;

determining a second outcome of the one or more expressions based on the second value of the second characteristic;

determining a second data store corresponding to the second outcome, wherein the second data store includes at least one second data store characteristic associated with the second characteristic of the second portion of the data object;

determining one or more of a second protocol or a second programming language associated with the second data store;

generating a second communication using the one or more of the second protocol or the second programming language, the second communication including the second portion of the data object; and providing the second communication and the second portion of the data object to the second data store.

6. The method of claim 5, wherein the first characteristic of the first portion includes a presence of confidential information, the second characteristic of the second portion includes an absence of the confidential information, and the at least one first data store characteristic includes one or more security features to control access to the confidential information.

7. The method of claim 5, further comprising receiving the at least one rule from a device associated with the data object, the at least one rule further including an indication of one or more particular data characteristics, the particular data characteristics including one or more of rank of the data object relative to other data objects, revenue associated with the data object, or a count of views of a webpage associated with the data object.

8. The method of claim 5, wherein determining the at least one rule includes:

determining correspondence between one or more of the first characteristic of the data object or a category associated with the data object and the at least one rule, wherein the at least one rule includes a preexisting rule.

9. The method of claim 5, further comprising:

receiving at least one third data store characteristic indicative of one or more of an access speed of the first data store, a financial cost of the first data store, or a computational cost of the first data store;

wherein determining the first data store corresponding to the first outcome of the at least one rule comprises:

determining a plurality of data stores corresponding to the first outcome of the at least one rule; and determining correspondence between the at least one third data store characteristic and the first data store.

10. The method of claim 5, further comprising:

determining a modification to the at least one rule to form a modified rule;

access the first portion of the data object previously stored in the first data store based on the first outcome of the at least one rule;

determining a third outcome using the modified rule, the third outcome associated with the first portion of the data object;

determining one or more of the second data store or a third data store corresponding to the third outcome of the modified rule;

generating a third communication including the first portion of the data object; and providing the third communication and the first portion of the data object to the one or more of the second data store or the third data store.

11. The method of claim 5, further comprising:

determining one or more of a third protocol or a third programming language associated with a third data store for archiving data objects;

generating a third communication using the one or more of the third protocol or the third programming language associated with the third data store, the third communication including the data object; and providing the third communication and the data object to the third data store for archival.

12. The method of claim 5, wherein the one or more expressions of the at least one rule associate an access frequency of the first portion of the data object with the first threshold value, the method further comprising:

determining a change in the access frequency of the first portion of the data object to form a modified access frequency;

determining a third outcome of the at least one rule based on the modified access frequency;

determining one or more of the second data store or a third data store corresponding to the third outcome;

generating a third communication including the first portion of the data object; and providing the third communication and the first portion of the data object to the one or more of the second data store or the third data store.

13. A system comprising:

one or more memories storing computer-executable instructions; and one or more hardware processors configured to execute the computer-executable instructions to:

receive a data object, an identifier associated with a first entity, and an indication of a category associated with the data object;

determine an absence of a rule received from the first entity that corresponds to the identifier and the category;

in response to the absence of the rule, determine one or more rules received from a second entity, wherein the one or more rules correspond to the identifier and the category, the one or more rules associating values of characteristics of the data object with one or more outputs;

determine a value of a characteristic of the data object;

determine, based on at least a subset of the one or more rules, at least one output corresponding to the value of the characteristic;

determine a configuration corresponding to the at least one output;

generate a communication based at least in part on the configuration, the communication including at least a portion of the data object; and provide the communication and the at least a portion of the data object to a destination corresponding to the at least one output.

14. The system of claim 13, wherein the computer-executable instructions to provide the communication and the at least a portion of the data object to the destination include computer-executable instructions to:

stream the at least a portion of the data object to an output device.

15. The system of claim 13, wherein the computer-executable instructions to provide the communication and the at least a portion of the data object to the destination comprise computer-executable instructions to provide the communication and the at least a portion of the data object to at least one data store, the system further comprising computer-executable instructions to:

receive an indication of a data store characteristic; and determine the at least one data store corresponding to the data store characteristic and to the value of the characteristic of the data object.

16. The system of claim 13, wherein the computer-executable instructions to determine the value of the characteristic of the data object include computer-executable instructions to:

determine a first value corresponding to a first portion of the data object; and determine a second value corresponding to a second portion of the data object;

wherein the at least one output includes a first output corresponding to the first value and a second output corresponding to the second value, the first output includes providing the first portion of the data object to a first data store having a first data store characteristic that corresponds to the first portion, and the second output includes providing the second portion of the data object to a second data store having a second data store characteristic that corresponds to the second portion.

17. The system of claim 16, further comprising computer-executable instructions to:

provide metadata associated with the first portion of the data object and the second portion of the data object, the metadata indicating an association between the first portion of the data object and the second portion of the data object;

receive a request to access the data object;

determine the metadata associated with one or more of the first portion or the second portion;

based at least in part on the metadata, access the first portion and the second portion;

generate the data object using the first portion and the second portion; and provide the data object responsive to the request.

18. The system of claim 13, wherein the at least a subset of the one or more rules includes:

an expression associating the value of the characteristic with a threshold value;

an indication of a first output associated with a first outcome of the expression; and an indication of a second output associated with a second outcome of the expression.

19. The system of claim 13, further comprising computer-executable instructions to:

determine a modification to one or more of a rule or the value of the characteristic;

determine, based on the modification, a second output corresponding to the value of the characteristic;

determine a second configuration corresponding to the second output;

generate a second communication based at least in part on the second configuration, the second communication including the at least a portion of the data object; and provide the second communication and the at least a portion of the data object to a second destination corresponding to the second output.

20. The system of claim 16, wherein the first value includes a presence of confidential information, the second value includes an absence of the confidential information, and the first data store characteristic includes at least one security feature for controlling access to the confidential information.

* * * * *